(12) United States Patent
Tanaka

(10) Patent No.: US 9,712,007 B2
(45) Date of Patent: Jul. 18, 2017

(54) ROTOR CORE, MOTOR AND MOTOR MANUFACTURING METHOD

(75) Inventor: Takeshi Tanaka, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 347 days.

(21) Appl. No.: 14/362,142

(22) PCT Filed: Sep. 7, 2012

(86) PCT No.: PCT/JP2012/072967
§ 371 (c)(1),
(2), (4) Date: Aug. 28, 2014

(87) PCT Pub. No.: WO2013/121611
PCT Pub. Date: Aug. 22, 2013

(65) Prior Publication Data
US 2015/0180292 A1    Jun. 25, 2015

(30) Foreign Application Priority Data
Feb. 17, 2012   (JP) ................................ 2012-033428

(51) Int. Cl.
*H02K 1/27*     (2006.01)
*H02K 15/03*    (2006.01)

(52) U.S. Cl.
CPC .......... *H02K 1/2773* (2013.01); *H02K 15/03* (2013.01); *H02K 2213/03* (2013.01); *Y10T 29/49012* (2015.01)

(58) Field of Classification Search
CPC .... H02K 1/2773; H02K 1/2766; H02K 15/03; H02K 21/12; H02K 21/14; H02K 21/16
(Continued)

(56) References Cited

U.S. PATENT DOCUMENTS 3,979,821 A    9/1976  Noodleman
5,162,686 A *  11/1992 Royer .................. H02K 1/2773
                                              310/156.59
(Continued)

FOREIGN PATENT DOCUMENTS

EP    1 286 446 A1    2/2003
EP    1 804 365 A2    7/2007
(Continued)

OTHER PUBLICATIONS

Official Communication issued in International Patent Application No. PCT/JP2012/072967, mailed on Nov. 27, 2012.

*Primary Examiner* — Tran Nguyen
(74) *Attorney, Agent, or Firm* — Keating & Bennett, LLP

(57) ABSTRACT

A rotor core includes a laminated steel body including a plurality of magnetic core plates stacked one above another. The core plates extend in a direction perpendicular or substantially perpendicular to a vertical center axis. The rotor core includes a plurality of magnetic pole portions arranged along a circumferential direction. At least some of the core plates include claws protruding from the magnetic pole portions in the circumferential direction and outer connection portions arranged radially outward of the claws to interconnect the magnetic pole portions adjoining to each other. The claws restrain the magnets from being displaced radially outward by centrifugal forces. In addition, the outer connection portions restrain the rotor core from being deformed by centrifugal forces. The outer connection portions restrain the claws from being displaced by centrifugal forces so as to further restrain displacement of the magnets.

11 Claims, 10 Drawing Sheets

(58) Field of Classification Search
USPC .......... 310/156.45, 156.53, 156.56–156.57
See application file for complete search history.

(56) References Cited

U.S. PATENT DOCUMENTS

| | | | |
|---|---|---|---|
| 5,369,325 A | 11/1994 | Nagate et al. | |
| 5,378,953 A * | 1/1995 | Uchida | H02K 21/14 310/156.57 |
| 6,437,474 B1 * | 8/2002 | Chu | H02K 1/2773 29/598 |
| 7,687,957 B2 * | 3/2010 | Ochiai | H02K 1/278 310/156.08 |
| 7,750,523 B2 * | 7/2010 | Nakayama | H02K 1/2766 310/156.53 |
| 8,232,703 B2 * | 7/2012 | Nakayama | H02K 1/2766 310/156.53 |
| 2007/0252469 A1 * | 11/2007 | Nishiura | H02K 1/2773 310/156.56 |
| 2008/0252165 A1 | 10/2008 | Riedl et al. | |
| 2009/0115280 A1 * | 5/2009 | Nakayama | H02K 1/2766 310/156.53 |
| 2009/0127961 A1 | 5/2009 | Pedersen et al. | |
| 2009/0230803 A1 | 9/2009 | Nakayama et al. | |
| 2009/0261677 A1 * | 10/2009 | Ishikawa | H02K 1/278 310/156.12 |
| 2011/0248596 A1 | 10/2011 | Utaka et al. | |
| 2011/0316378 A1 * | 12/2011 | Matt | H02K 1/2773 310/156.53 |
| 2012/0038237 A1 * | 2/2012 | Li | H02K 1/146 310/156.45 |

FOREIGN PATENT DOCUMENTS

| | | |
|---|---|---|
| JP | 04-071342 A | 3/1992 |
| JP | 07-312852 A | 11/1995 |
| JP | 09-294344 A | 11/1997 |
| JP | 2001-086673 A | 3/2001 |
| JP | 2008-011692 A | 1/2008 |
| JP | 2008-199794 A | 8/2008 |
| JP | 2009-240036 A | 10/2009 |
| JP | 2010-220359 A | 9/2010 |

* cited by examiner

ROTOR CORE, MOTOR AND MOTOR MANUFACTURING METHOD

BACKGROUND OF THE INVENTION

1. Field of the Invention

The present invention relates to a rotor core, a motor, and a motor manufacturing method.

2. Description of the Related Art

Conventionally, there is known a so-called inner-rotor-type motor in which a rotary unit having a magnet is arranged inside a stationary unit having a coil. For example, a permanent-magnet-type rotor disclosed in Japanese Patent Application Publication No. H7-312852 or a rotor of an embedded-magnet-type rotary electric machine disclosed in Japanese Patent Application Publication No. 2010-220359 can be applied to the rotary unit of the inner-rotor-type motor.

The permanent-magnet-type rotor disclosed in Japanese Patent Application Publication No. H7-312852 includes a plurality of permanent magnets arranged at a regular interval along a circumferential direction and a plurality of yoke portions provided between the respective permanent magnets, each of the yoke portions having a sector-like cross section (see, for example, claim 1 and FIG. 1 of Japanese Patent Application Publication No. H7-312852). The rotor of a second embodiment of Japanese Patent Application Publication No. 2010-220359 includes a plurality of radially-arranged magnets and a rotor core having a plurality of magnet mounting holes (see, for example, Paragraph 0021 and FIG. 10 of Japanese Patent Application Publication No. 2010-220359).

When the motor is driven, centrifugal forces are exerted on the magnets. For that reason, the permanent-magnet-type rotor disclosed in Japanese Patent Application Publication No. H7-312852 is provided with lug portions protruding into openings of insertion grooves, thereby preventing the permanent magnets from moving toward the outer circumference (see, for example, Paragraph 0006 and FIG. 1 of Japanese Patent Application Publication No. H7-312852). The rotor of a second embodiment of Japanese Patent Application Publication No. 2010-220359 includes outer bridge portions formed at the outer peripheral side of the magnet mounting holes (see, for example, Paragraph 0022 and FIGS. 10 and 11 of Japanese Patent Application Publication No. 2010-220359).

In the rotor in which the magnetic pole portions made of a magnetic material and the magnets are alternately arranged along a circumferential direction, the rotor core becomes partially thin. Therefore, the rotor core is easily deformed by centrifugal forces. If the rotor core is deformed, the magnets are likely to undergo displacement. Deformation of the rotor core and displacement of the magnets tend to pose problems particularly in a high-speed motor.

SUMMARY OF THE INVENTION

Preferred embodiments of the present invention provide a technology capable of restraining deformation of a rotor core and displacement of magnets caused by centrifugal forces in a motor in which the magnets and the magnetic pole portions of the rotor core are alternately arranged along a circumferential direction.

In an illustrative preferred embodiment of the present invention, a rotor core includes a laminated steel body defined by axially laminating a plurality of magnetic core plates one above another. The plurality of magnetic core plates extend in a direction perpendicular or substantially perpendicular to a vertical center axis. The rotor core includes a plurality of magnetic pole portions arranged along a circumferential direction. Each of the plurality of magnetic pole portions includes a pair of circumferential end surfaces and a radial end surface. The circumferential end surfaces face toward magnet insertion spaces defined between ones of the plurality of magnetic pole portions adjoining each other. The radial end surface faces toward a space radially outward of each of the magnetic pole portions. At least some of the plurality of magnetic core plates include claws and outer connection portions. The claws protrude from the magnetic pole portions in the circumferential direction. The outer connection portions are arranged radially outward of the claws to interconnect the ones of the plurality of magnetic pole portions adjoining to each other. The magnet insertion spaces are interposed between the circumferential end surfaces and positioned radially inward of the claws.

According to one illustrative preferred embodiment of the present invention, the claws restrain the magnets from being displaced radially outward by centrifugal forces. In addition, the outer connection portions restrain the rotor core from being deformed by centrifugal forces. In particular, the outer connection portions restrain the claws from being displaced by centrifugal forces. This makes it possible to further restrain displacement of the magnets.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Illustrative preferred embodiments of the present invention will now be described with reference to the drawings.

In the subject specification, the direction parallel or substantially parallel to the center axis of a motor will be referred to as "axial direction". The direction perpendicular to the center axis of a motor will be referred to as "radial direction". The direction extending along a circular arc about the center axis of a motor will be referred to as "circumferential direction". In the following description, the shape and positional relationship of individual components will be described under the assumption that the axial direction is an up-down direction. However, these definitions are made merely for the sake of convenience in description and are not intended to limit the orientation of the present rotor core and the present motor when in use.

First Preferred Embodiment

Figure 1:
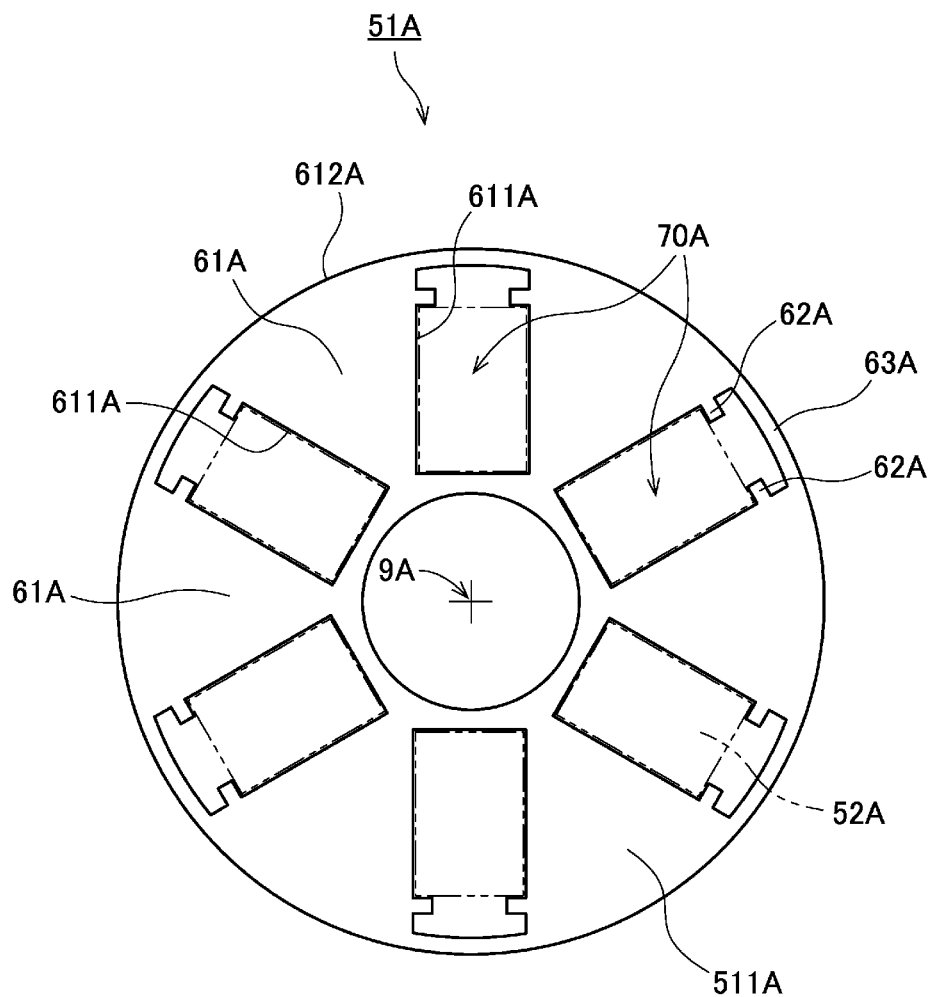
FIG. 1 is a plan view showing a rotor core according to a first preferred embodiment of the present invention.

FIG. 1 is a plan view showing a rotor core 51A according to a first preferred embodiment of the present invention. The rotor core 51A preferably includes a laminated steel body defined by axially laminating a plurality of magnetic core plates 511A one above another. Each of the core plates 511A extend in a direction perpendicular or substantially perpendicular to a center axis 9A.

As shown in FIG. 1, the rotor core 51A preferably includes a plurality of magnetic pole portions 61A arranged along a circumferential direction. Magnet insertion spaces 70A are provided between the magnetic pole portions 61A adjoining to each other. Each of the magnetic pole portions 61A includes a pair of circumferential end surfaces 611A and a radial end surface 612A. The circumferential end surfaces 611A face toward the magnet insertion spaces 70A. The radial end surface 612A faces toward a space existing radially outward of each of the magnetic pole portions 61A.

In the rotor core 51A, at least one of the core plates 511A preferably includes claws 62A and outer connection portions 63A. The claws 62A protrude from the magnetic pole portions 61A in the circumferential direction. The outer connection portions 63A are arranged radially outward of the claws 62A to interconnect the magnetic pole portions 61A adjoining to each other. Each of the magnet insertion spaces 70A is interposed between the circumferential end surfaces 611A and is positioned radially inward of the claws 62A.

As indicated by double-dot chain lines in FIG. 1, magnets 52A are accommodated within the magnet insertion spaces 70A. The claws 62A restrain the magnets 52A from being displaced radially outward by centrifugal forces. The outer connection portions 63A restrain the circumferential gaps between the adjoining magnetic pole portions 61A from becoming wide. This restrains the rotor core 51A from being deformed by centrifugal forces.

More specifically, when centrifugal forces are exerted on the rotor core 51A, forces acting radially outward are applied to the magnetic pole portions 61A. Assuming that the magnetic pole portions 61A are displaced radially outward, the circumferential gaps between the adjoining magnetic pole portions 61A grow wider. In the rotor core 51A, however, the adjoining magnetic pole portions 61A are interconnected by the outer connection portions 63A. For that reason, the circumferential gaps between the adjoining magnetic pole portions 61A are only barely widened. Accordingly, it is possible to restrain the magnetic pole portions 61A from being displaced radially outward.

Since the outer connection portions 63A restrain the circumferential gaps between the adjoining magnetic pole portions 61A from being widened by centrifugal forces, it is possible for the outer connection portions 63A to restrain displacement of the claws 62A. This makes it possible to further restrain displacement of the magnets 52A. Inasmuch as the radial outward displacement of the magnetic pole portions 61A is restrained by the outer connection portions 63A, it is possible to reduce stresses generated in the radial inner sections of the magnetic pole portions 61A.

Second Preferred Embodiment

Figure 2:
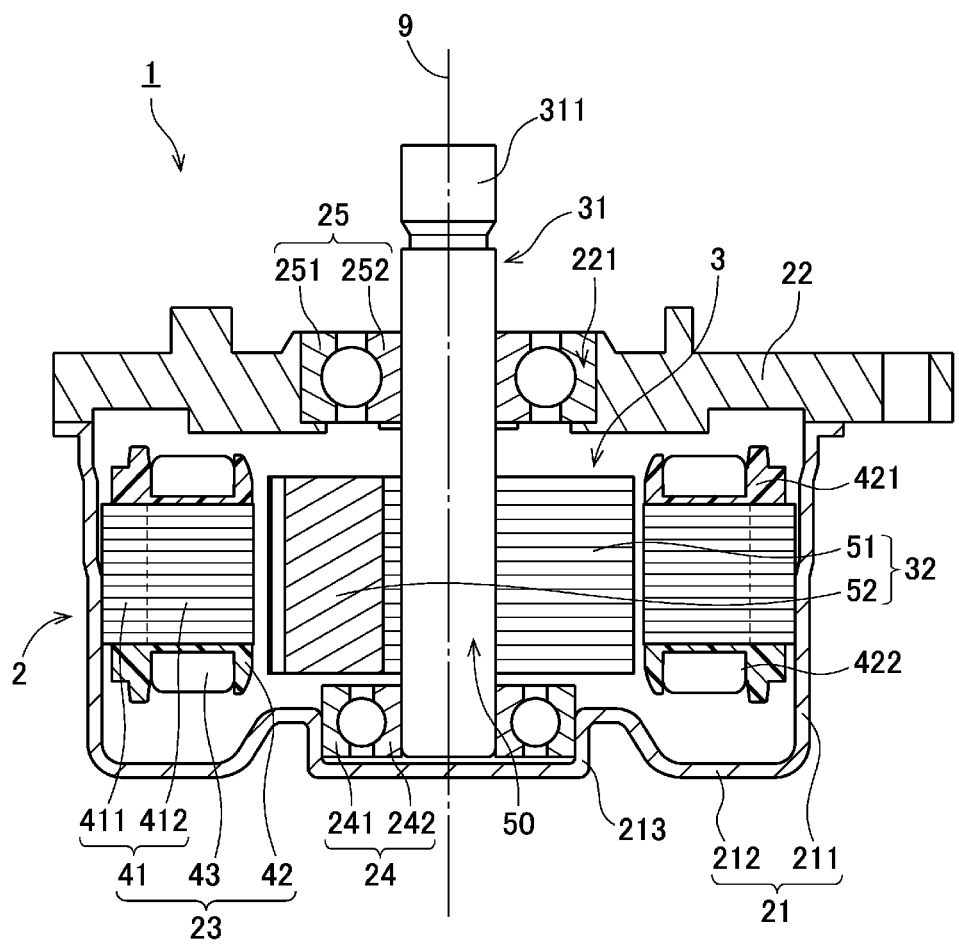
FIG. 2 is a vertical sectional view showing a motor according to a second preferred embodiment of the present invention.

Next, description will be made on a motor according to a second preferred embodiment of the present invention. FIG. 2 is a vertical sectional view showing a motor 1 according to a second preferred embodiment. As shown in FIG. 2, the motor 1 preferably includes a stationary unit 2 and a rotary unit 3. The stationary unit 2 is fixed to a frame of a device to be driven. The rotary unit 3 is rotatably supported with respect to the stationary unit 2.

The stationary unit 2 of the present preferred embodiment preferably includes a housing 21, a cover 22, a stator unit 23, a lower bearing unit 24, and an upper bearing unit 25.

The housing 21 preferably includes a cylindrical or substantially cylindrical sidewall 211 and a bottom wall 212 to close the lower opening of the sidewall 211. The cover 22 closes the upper opening of the housing 21. The stator unit 23 and the rotor unit 32 (described later) are accommodated within an internal space surrounded by the housing 21 and the cover 22. A recess portion 213 configured to receive the lower bearing unit 24 is arranged in the central region of the bottom portion 212 of the housing 21. A circular hole 221 configured to receive the upper bearing unit 25 is defined in the central region of the cover 22.

The stator unit 23 preferably includes a stator core 41, an insulator 42 and a coil 43. The stator core 41 is preferably provided by a laminated steel body defined by axially laminating electromagnetic steel plates one above another. The stator core 41 preferably includes an annular core-back 411 and a plurality of teeth 412 protruding radially inward from the core-back 411. The core-back 411 is arranged in a coaxial or substantially coaxial relationship with the center axis 9. The outer circumferential surface of the core-back 411 is fixed to the inner circumferential surface of the sidewall 211 of the housing 21. The teeth 412 are arranged at a regular or substantially regular interval along the circumferential direction. The respective teeth 412 extend radially with respect to the center axis 9.

The insulator 42 is preferably made of, for example, a resin as an electrically insulating body. The upper surface, the lower surface, and the circumferential opposite surfaces of each of the teeth 412 are covered by the insulator 42. The coil 43 is preferably defined by a conductive wire wound around the insulator 42. In the present preferred embodiment, the conductive wire is wound around each of the teeth 412 through the insulator 42. The insulator 42 is interposed between each of the teeth 412 and the coil 43, thus preventing each of the teeth 412 and the coil 43 from being electrically short-circuited.

Instead of using the insulator 42, the surface of each of the teeth 412 may alternatively be subjected to an insulation coating.

The lower bearing unit 24 and the upper bearing unit 25 are preferably arranged between the housing 21, the cover 22, and the shaft 31 of the rotary unit 3. In the present preferred embodiment, ball bearings, in which an outer race and an inner race are rotated relative to each other through balls, are preferably used as the lower bearing unit 24 and the upper bearing unit 25. However, instead of the ball bearings, it is also possible to use any other desirable type of bearings such as, for example, plain bearings, fluid bearings, etc.

The lower bearing unit 24 preferably includes an outer race 241 arranged within the recess portion 213 of the housing 21 and fixed to the housing 21. The upper bearing unit 25 preferably includes an outer race 251 arranged within the circular hole 221 of the cover 22 and fixed to the cover 22. On the other hand, the lower bearing unit 24 and the upper bearing unit 25 include inner races 242 and 252 fixed to the shaft 31. As a consequence, the shaft 31 is rotatably supported with respect to the housing 21 and the cover 22.

The rotary unit 3 of the present preferred embodiment preferably includes a shaft 31 and a rotor unit 32.

The shaft 31 is, for example, a columnar metal member extending along the center axis 9. The shaft 31 is supported on the lower bearing unit 24 and the upper bearing unit 25 and is rotated about the center axis 9. The shaft 31 preferably includes a head portion 311 protruding upward beyond the cover 22. The head portion 311 is connected through a power transmission mechanism such as, e.g., gears, to a device to be driven.

The rotor unit 32 is arranged radially inward of the stator unit 23 and is rotated together with the shaft 31. The rotor unit 32 preferably includes a rotor core 51 and a plurality of magnets 52. An axially-extending through-hole 50 is provided in the central region of the rotor core 51. The shaft 31 is preferably, for example, press-fitted to the through-hole 50 of the rotor core 51. The magnets 52 are arranged at a regular or substantially regular interval in the circumferential direction. Each of the magnets 52 is held by the rotor core 51.

In the motor 1 described above, when an electrical drive current is supplied to the coil 43 of the stationary unit 2, radial magnetic flux is generated in the teeth 412. Circumferential torque is generated by the magnetic flux acting between the teeth 412 and the rotor unit 32. As a result, the rotary unit 3 is rotated about the center axis 9 with respect to the stationary unit 2.

Figure 3:
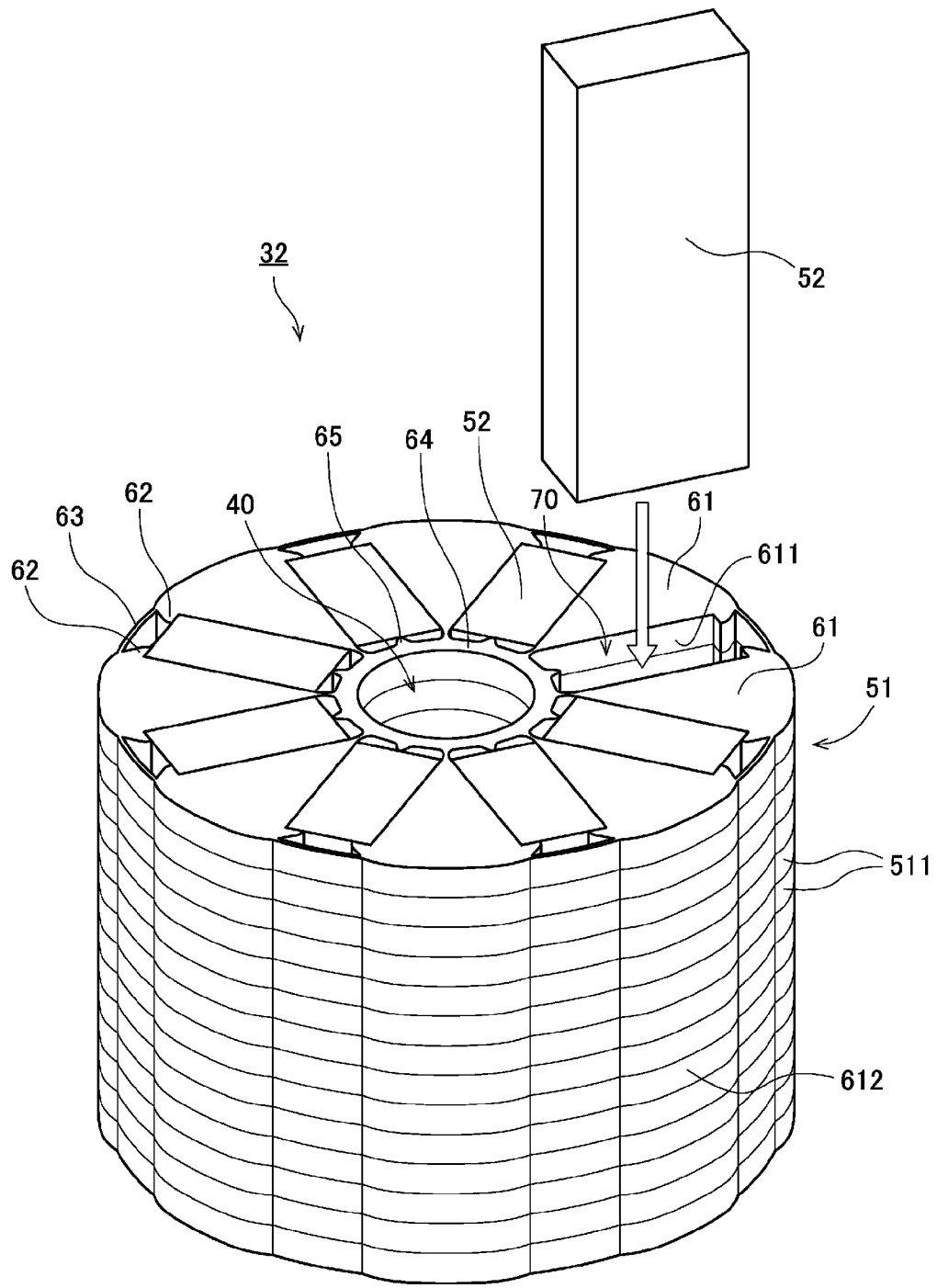
FIG. 3 is a perspective view showing a rotor unit according to the second preferred embodiment of the present invention.
Figure 4:
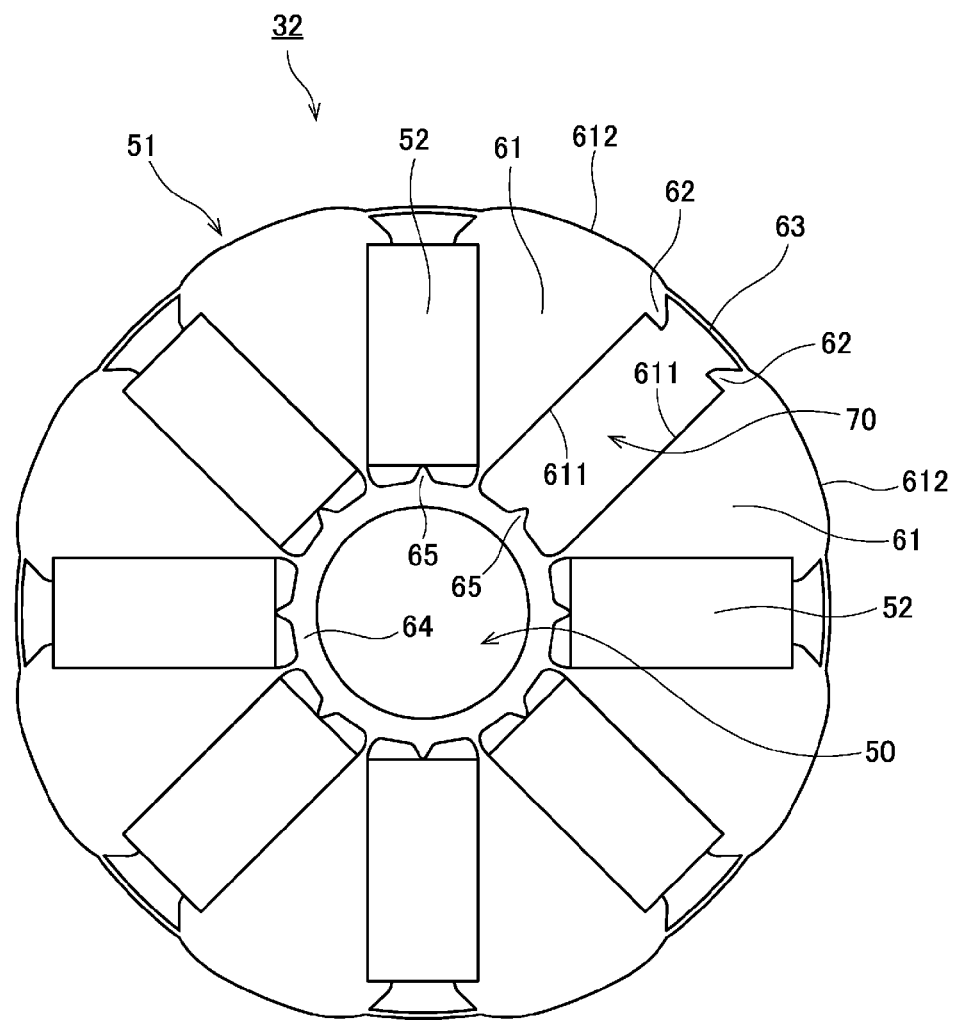
FIG. 4 is a plan view of the rotor unit according to the second preferred embodiment of the present invention.
Figure 5:
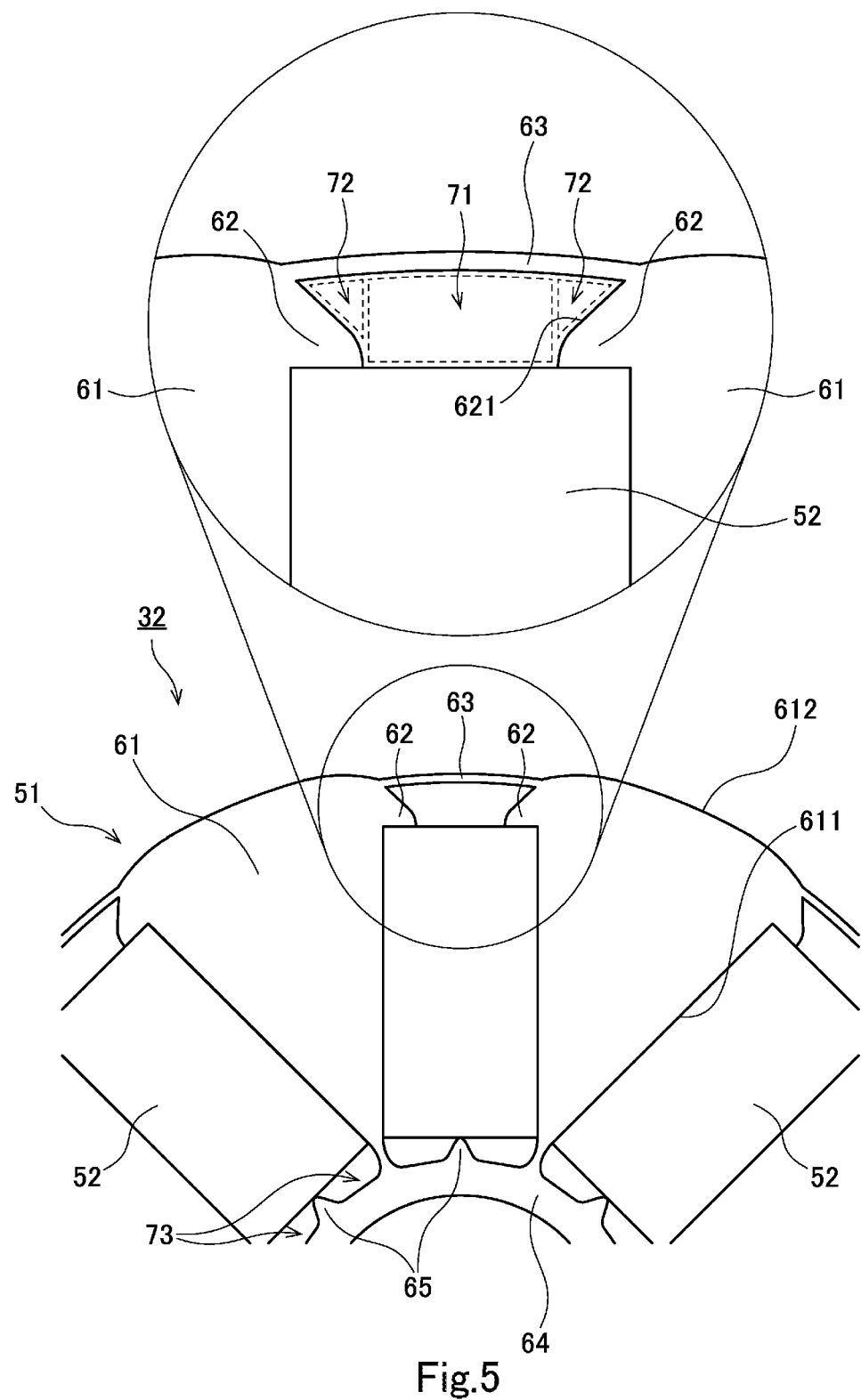
FIG. 5 is a partial plan view of the rotor unit according to the second preferred embodiment of the present invention.

Next, the detailed structure of the rotary unit 3 will be described with reference to FIGS. 3 through 5. FIG. 3 is a perspective view showing the rotor unit 32. In FIG. 3, one of the magnets 52 is shown in an exploded state. FIG. 4 is a plan view showing the rotor unit 32. In FIG. 4, one of the magnets 52 is omitted. FIG. 5 is a partial plan view showing the rotor unit 32.

As shown in FIG. 3, the rotor core 51 is preferably provided by a laminated steel body defined by axially laminating a plurality of core plates 511 one above another. Each of the core plates 511 is a magnetic plate extending in a direction orthogonal to the center axis 9. Use of the laminated steel body makes it possible to reduce an overcurrent generated within the rotor core 51. Accordingly, magnetic flux is efficiently fed to the rotor core 51. As shown in FIGS. 3 through 5, the rotor core 51 preferably includes a plurality of magnetic pole portions 61, a plurality of claws 62, a plurality of outer connection portions 63, an inner connection portion 64, and a plurality of protrusions 65.

The magnetic pole portions 61 are arranged around the shaft 31 at a regular or substantially regular interval along the circumferential direction. When seen in a plan view, each of the magnetic pole portions 61 has a sector-shaped or substantially sector-shaped contour, a sector being a plane figure bounded by two radii and the included arc of a circle. Each of the magnetic pole portions 61 includes a pair of circumferential end surfaces 611 facing toward the magnet insertion spaces 70 to be described later. Each of the magnetic pole portions 61 includes a radial end surface 612 facing toward a space existing radially outward of each of the magnetic pole portions 61. In other words, the radial end surfaces 612 of the magnetic pole portions 61 are radially opposed to the radial inner surfaces of the teeth 412.

Magnet insertion spaces 70 are preferably provided between the magnetic pole portions 61 adjoining to each other. The magnets 52 are respectively accommodated within the magnet insertion spaces 70. The circumferential opposite end surfaces of the magnets 52 are preferably adhesively, for example, fixed to the circumferential end surfaces 611 of the magnetic pole portions 61. Consequently, as shown in FIGS. 3 through 5, the magnets 52 and the magnetic pole portions 61 are alternately arranged along the circumferential direction.

The circumferential opposite end surfaces of the magnets 52 define and serve as magnetic pole surfaces circumferentially opposed to the circumferential end surfaces 611 of the magnetic pole portions 61. The magnets 52 are arranged so that the magnetic pole surfaces having the same pole can be opposed to each other in the circumferential direction. Each of the magnetic pole portions 61 is magnetized by the magnets 52 arranged at the opposite sides thereof. As a result, the radial outer surfaces of the magnetic pole portions 61 serve as magnetic pole surfaces. In other words, the magnetic flux generated from the magnets 52 flow radially outward of the magnetic pole portions 61 through the magnetic pole portions 61.

Ferrite-based sintered magnets or neodymium magnets, for example, are preferably used as the magnets 52. In recent years, the price of neodymium as a rare-earth element continues to increase, which makes it difficult to use neodymium magnets. For that reason, there is an increasing demand for a technology by which strong magnetic forces can be obtained using ferrite-based sintered magnets. If the magnetic pole portions 61 of the rotor core 51 and the magnets 52 are alternately arranged in the circumferential direction as in the present preferred embodiment, it becomes possible to increase the volumetric ratio of the magnets 52 in the rotor unit 32. This makes it possible to obtain strong magnetic forces while using ferrite-based sintered magnets.

The claws 62 are arranged in the radial outer regions of the circumferential end surfaces 611 to protrude from the respective magnetic pole portions 61 in the circumferential direction. Each of the magnet insertion spaces 70 is interposed between the circumferential end surfaces 611 and is positioned radially inward of each of the claws 62. The radial inner surfaces of the claws 62 at least partially contact the radial outer surfaces of the magnets 52. Centrifugal forces are applied to the magnets 52 during the operation of the motor 1. Nevertheless, due to the contact between the magnets 52 and the claws 62, the magnets 52 are restrained from moving radially outward.

In the present preferred embodiment, all the core plates 511 defining the rotor core 51 are preferably provided with the claws 62. As a result, the claws 62 have increased rigidity with respect to the centrifugal forces. This makes it possible to further restrain the displacement of the magnets 52 caused by the centrifugal forces. In the present preferred embodiment, a pair of claws 62 is arranged radially outward of each of the magnet insertion spaces 70. This makes it possible to further increase the holding strength of the magnets 52.

As shown in FIG. 5, the claws 62 of the present preferred embodiment preferably include slant surfaces 621 inclined with respect to the radial direction and the circumferential direction. The slant surfaces 621 are inclined to come closer to the base end portions of the claws 62 as they extend radially outward. The radial width of the claws 62 is increased from the tip end portions of the claws 62 toward the base end portions thereof. Use of this configuration makes it possible to further restrain deformation of the claws 62 caused by the centrifugal forces. Accordingly, it is possible to further restrain displacement of the magnets 52 caused by the centrifugal forces.

The outer connection portions 63 are arranged radially outward of the claws 62 to interconnect the magnetic pole portions 61 adjoining to each other. The outer connection portions 63 restrain the deformation of the rotor core 51 caused by the centrifugal forces. More specifically, since the magnetic pole portions 61 adjoining to each other are interconnected by the outer connection portions 63, the circumferential gaps between the magnetic pole portions 61 adjoining to each other are barely widened even if the centrifugal forces are applied to the magnetic pole portions 61. As a result, the magnetic pole portions 61 are only barely displaced radially outward.

In particular, the outer connection portions 63 restrain the claws 62 from being displaced radially outward by the centrifugal forces. This makes it possible to further restrain the radial outward displacement of the magnets 52 making contact with the claws 62. In the present preferred embodiment, all the core plates 511 defining the rotor core 51 are provided with the outer connection portions 63. This makes it possible to further restrain deformation of the rotor core 51 caused by the centrifugal forces.

In the present preferred embodiment, as shown in FIGS. 4 and 5, the radial outer surface of each of the outer connection portions 63 is preferably positioned radially inward of the radial end surface 612 of each of the magnetic pole portions 61. Therefore, the radial distance between the radial outer surface of each of the outer connection portions 63 and the radial inner end surface of each of the teeth 412 is longer than the radial distance between the radial end surface 612 of each of the magnetic pole portions 61 and the radial inner end surface of each of the teeth 412. In this configuration, if the radial positions of the outer connection portions 63 are set appropriately, the waveform of the voltage induced during the operation of the motor 1 can be made sinusoidal or substantially sinusoidal. If the waveform of the voltage induced is made sinusoidal or substantially sinusoidal, it is possible to restrain the pulsation of torque. As a result, it is possible to reduce vibrations and noises generated during the operation of the motor 1.

As shown in FIG. 5, a first space 71 is preferably defined between each of the magnets 52 and each of the outer connection portions 63. The first space 71 is positioned radially outward of each of the magnet insertion spaces 70 and is interposed between a pair of the claws 62. Each of the outer connection portions 63 exists radially outward of the first space 71 and extends in the circumferential direction. The first space 71 becomes a magnetic flux barrier in between each of the magnets 52 and each of the outer connection portions 63. In other words, a magnetic path between each of the magnets 52 and each of the outer connection portions 63 is narrowed by the first space 71. This restrains magnetic flux from being leaked toward each of the outer connection portions 63.

In the present preferred embodiment, second spaces 72 are preferably defined at the circumferential opposite sides of the first space 71. Each of the second spaces 72 exists between the slant surface 621 of each of the claws 62 and the radial inner surface of each of the outer connection portions 63. Each of the second spaces 72 preferably becomes a magnetic flux barrier in between each of the claws 62 and each of the outer connection portions 63. In other words, a magnetic path between each of the claws 62 and each of the outer connection portions 63 is narrowed by each of the second spaces 72. This structure further restrains magnetic flux from being leaked toward each of the outer connection portions 63.

If the leakage of the magnetic flux toward the outer connection portions 63 is restrained, the amount of the magnetic flux flowing from the magnets 52 toward the teeth 412 through the magnetic pole portions 61 is increased. This helps increase the efficiency of the motor 1. If the structure of the present preferred embodiment is used, it is possible to restrain the leakage of magnetic flux toward the outer connection portions 63 without having to make the radial thickness of the outer connection portions 63 extremely thin or to subject the outer connection portions 63 to feeble magnetism treatment such as heating or the like.

The inner connection portion 64 is preferably a cylindrical or substantially cylindrical portion arranged radially inward of the magnetic pole portions 61 and extending in the circumferential direction. As shown in FIGS. 3 to 5, the inner connection portion 64 may have an annular shape when seen in a plan view or may be provided only in a partial extent along the circumferential direction. In the present preferred embodiment, the magnetic pole portions 61 are circumferentially interconnected to one another by the outer connection portions 63 and the inner connection portion 64. This helps increase the rigidity of the rotor core 51. It is therefore possible to further restrain the rotor core 51 from being deformed by centrifugal forces.

In the present preferred embodiment, a third space 73 exists between the inner connection portion 64 and each of the magnet insertion spaces 70. The third space 73 becomes a magnetic flux barrier in between each of the magnets 52 and the inner connection portion 64. In other words, a magnetic path between each of the magnets 52 and the inner connection portion 64 is narrowed by the third space 73. This helps restrain the leakage of magnetic flux toward the inner connection portion 64. If the leakage of magnetic flux toward the inner connection portion 64 is restrained, the amount of the magnetic flux flowing from the magnets 52 toward the teeth 412 through the magnetic pole portions 61 is further increased.

The protrusions 65 protrude radially outward from the radial outer surface of the inner connection portion 64. The apex of each of the protrusions 65 contacts the radial inner surface of each of the magnets 52. The radial position of each of the magnets 52 is determined by a pair of the claws 62 and each of the protrusions 65. In the present preferred embodiment, each of the protrusions 65 is arranged in the same or substantially the same circumferential position as the circumferential center of each of the magnet insertion spaces 70. The third space 73 exists at the circumferential opposite sides of each of the protrusions 65. This prevents the magnetic paths between the magnetic pole portions 61 and the inner connection portion 64 from being enlarged by the protrusions 65. It is therefore possible to further restrain the leakage of magnetic flux toward the inner connection portion 64.

Figure 6:
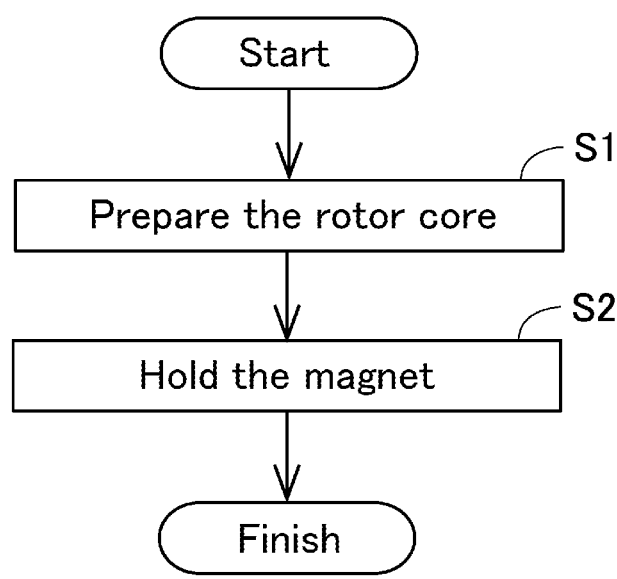
FIG. 6 is a flowchart illustrating a manufacturing sequence of the rotor unit according to the second preferred embodiment of the present invention.

FIG. 6 is a flowchart illustrating a manufacturing sequence of the rotor unit 32 in the manufacturing sequence of the motor 1 in accordance with a preferred embodiment of the present invention. In order to manufacture the rotor unit 32, a rotor core 51 is prepared first (step S1). More specifically, a plurality of core plates 511 is punched using electromagnetic steel plates. The core plates 511 are laminated one above another and are fixed to one another by caulking. As a result, it is possible to obtain a rotor core 51 including a plurality of magnetic pole portions 61, a plurality of claws 62, a plurality of outer connection portions 63, an inner connection portion 64, and a plurality of protrusions 65.

Next, a plurality of magnets 52 are accommodated within a plurality of magnet insertion spaces 70 located in the rotor core 51 (step S2). The magnets 52 are fixed to the rotor core 51 by, e.g., an adhesive agent. Alternatively, the magnets 52 may be press-fitted to the rotor core 51 without having to use the adhesive agent.

In the rotor unit 32 of the present preferred embodiment, as described above, the leakage of magnetic flux toward the outer connection portions 63 is restrained by the first space 71 and the second spaces 72. Moreover, leakage of magnetic flux toward the inner connection portion 64 is restrained by the third space 73. Accordingly, a rotor unit 32 having increased magnetic efficiency can be manufactured without having to subject the outer connection portions 63 and the inner connection portion 64 to feeble magnetism treatment such as heating or the like.

Modifications of Preferred Embodiments

While illustrative preferred embodiments of the present invention have been described above, the present invention is not limited to the foregoing preferred embodiments.

Figure 7:
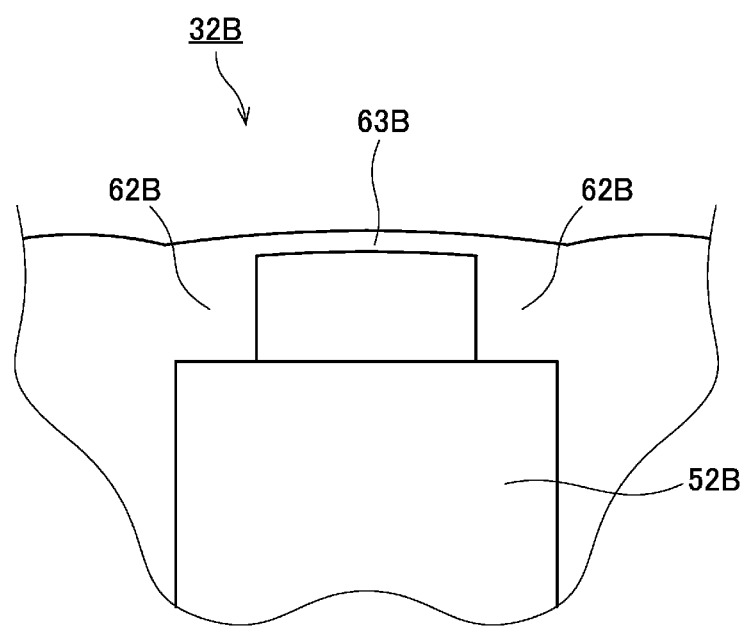
FIG. 7 is a partial plan view showing a rotor unit according to a modified example of a preferred embodiment of the present invention.

FIG. 7 is a partial plan view showing a rotor unit 32B according to one modified example of a preferred embodiment of the present invention. In the example shown in FIG. 7, the circumferential opposite end sections of each of the outer connection portions 63B and the claws 62B are directly connected to each other. In the example shown in FIG. 7, a space is provided between each of the magnets 52B and each of the outer connection portions 63B. However, the second spaces 72 shown in FIG. 5 are omitted in the example shown in FIG. 7. This helps further enhance the rigidity of the claws 62B. It is therefore possible to further restrain the deformation of the claws 62B caused by centrifugal forces. However, with a view to restrain the leakage of magnetic flux toward the outer connection portions, it is preferred that, as in the foregoing preferred embodiments, the second spaces 72 exist between the claws 62 and the outer connection portions 63.

Figure 8:
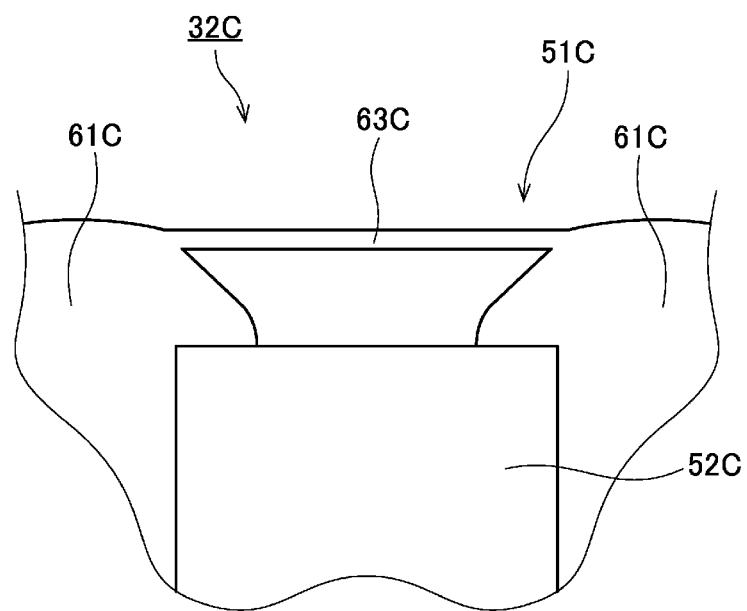
FIG. 8 is a partial plan view showing a rotor unit according to another modified example of a preferred embodiment of the present invention.

FIG. 8 is a partial plan view showing a rotor unit 32C according to another modified example of a preferred embodiment of the present invention. In the example shown in FIG. 8, when seen in a plan view, each of the outer connection portions 63C rectilinearly interconnects the magnetic pole portions 61C adjoining to each other. A space is provided between each of the outer connection portions 63C and each of the magnets 52C. With this configuration, as compared with a case where the outer connection portions 63C are absent, it is possible to restrain the deformation of the rotor core 51C. However, it is preferred that, as in the foregoing preferred embodiments, the outer connection portions 63 are curved radially outward. This is because the circumferential opposite end sections of the outer connection portions 63 are barely displaced radially outward. Accordingly, it is less likely that the rotor core 51 is deformed by the centrifugal forces.

Figure 9:
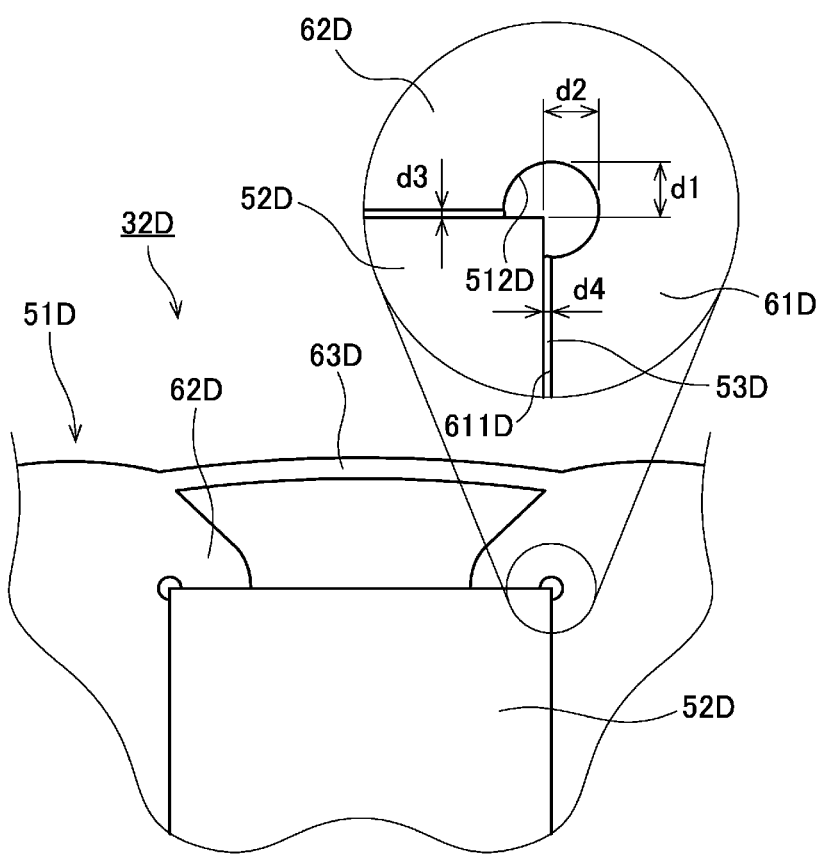
FIG. 9 is a partial plan view showing a rotor unit according to a further modified example of a preferred embodiment of the present invention.

FIG. 9 is a partial plan view showing a rotor unit 32D according to a further modified example of a preferred embodiment of the present invention. In the example shown in FIG. 9, grooves 512D are preferably provided in the rotor core 51D. The grooves 512D are provided in the borders between the circumferential end surfaces 611D of the magnetic pole portions 61D and the radial inner surfaces of the claws 62D and are recessed away from the magnets 52D. The grooves 512D extend in the axial direction through a plurality of core plates.

As shown in FIG. 9 on an enlarged scale, the magnets 52D are fixed to the rotor core 51D by an adhesive agent 53D. The radial gap d1 and the circumferential gap d2 between the grooves 512D and the corners of the magnets 52D are larger than the radial gap d3 between the radial inner surfaces of the claws 62D and the magnets 52D and the circumferential gap d4 between the circumferential end surfaces 611D of the magnetic pole portions 61D and the magnets 52D.

The grooves 512D are configured to prevent or substantially prevent the corners 521D of the magnets 52D from contacting the rotor core 51D and eventually undergoing breakage. In addition, the corners of the magnets 52D do not need to be cut in an effort to prevent the corners of the magnets 52D from contacting the rotor core 51D. Accordingly, there is no need to reduce the size of the magnets 52D.

Figure 10:
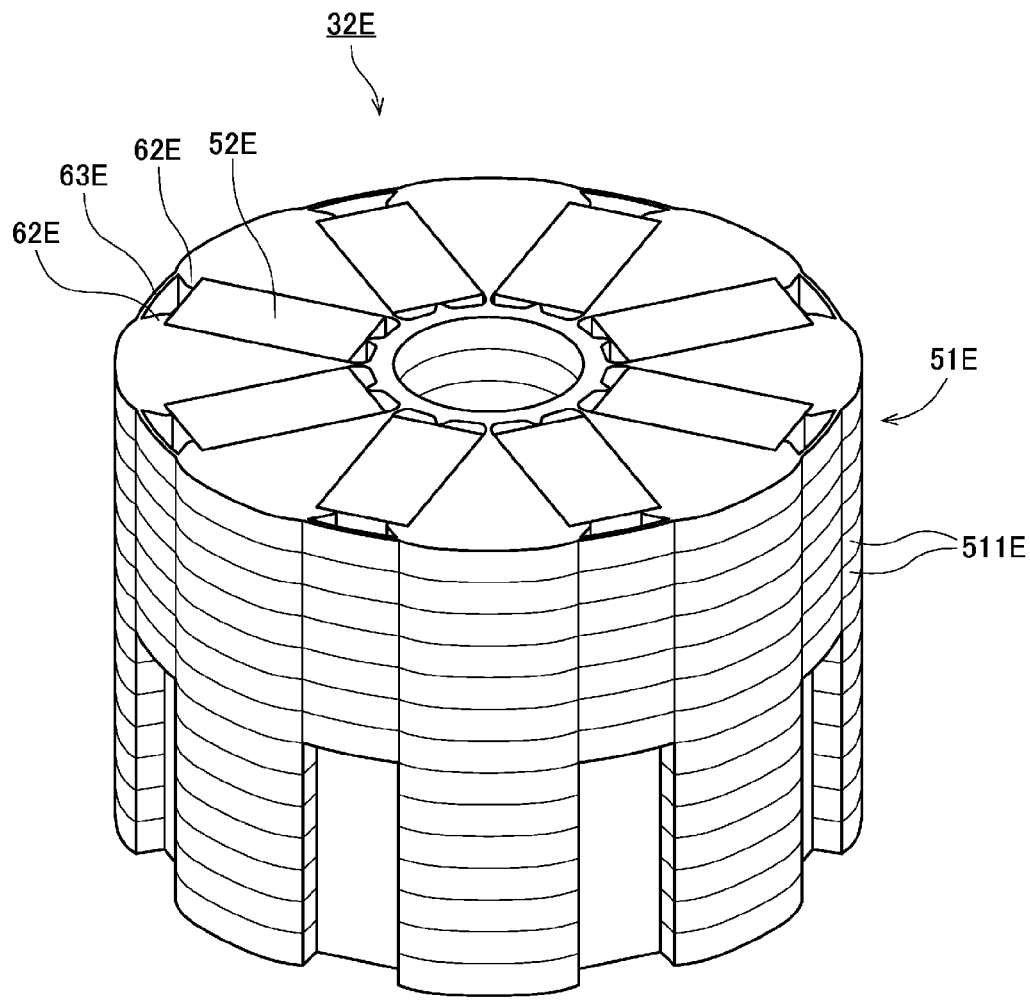
FIG. 10 is a perspective view showing a rotor unit according to a still further modified example of a preferred embodiment of the present invention.

FIG. 10 is a perspective view showing a rotor unit 32E according to a still further modified example of a preferred embodiment of the present invention. In the example shown in FIG. 10, the claws 62E and the outer connection portions 63E are provided in only some of the core plates 511E defining the rotor core 51E. In this manner, the claws and the outer connection portions need only to be provided in at least some of the core plates.

Unlike the configuration shown in FIG. 10, the claws and the outer connection portions may be provided in only the axially uppermost and axially lowermost core plates of the rotor core. The core plates provided with the claws and the outer connection portions and the core plates not provided with the claws and the outer connection portions may be alternately arranged in the axial direction. The rotor core may be defined by arbitrarily combining the core plates provided with only the claws and the core plates provided with only the outer connection portions.

The rotor unit may further include a resin portion configured to encapsulate the rotor core and the magnets.

The rotor core and the motor of various preferred embodiments of the present invention are preferably used in, e.g., home appliances such as a cleaner and a washer, transportation equipment such as a motor vehicle and the like, office automation devices, medical devices, and so forth. However, the rotor core and the motor of various preferred embodiments of the present invention may be used in other applications. In a high-speed motor, the deformation of the rotor core and the displacement of the magnets caused by centrifugal forces easily cause problems. For that reason, the structure of various preferred embodiments of the present invention is particularly useful in the high-speed motor. More specifically, various preferred embodiments of the present invention may preferably be applied to a motor having a rated revolution number of 10000 rpm or more or a motor having a rated revolution number of 15000 rpm or more.

In addition, the specific shapes of the respective members may differ from those shown in the respective figures of the subject application. The respective components of the preferred embodiments and modified examples described above may be appropriately combined unless a conflict arises.

Preferred embodiments of the present invention can find applications in a rotor core, a motor, and a motor manufacturing method, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A rotor core comprising:
a laminated steel body including a plurality of axially laminated magnetic core plates extending in a direction perpendicular or substantially perpendicular to a vertical center axis; and
a plurality of magnetic pole portions arranged along a circumferential direction with magnet insertion spaces defined between adjoining ones of the magnetic pole portions, each of the plurality of magnetic pole portions including a pair of circumferential end surfaces facing toward the magnet insertion spaces and a radial end surface facing toward a space that is radially outward of each of the magnetic pole portions; wherein
at least some of the plurality of magnetic core plates include claws protruding from the plurality of magnetic pole portions in the circumferential direction and outer connection portions located radially outward of the claws to interconnect the adjoining ones of the plurality of magnetic pole portions;
the magnet insertion spaces are interposed between the circumferential end surfaces of the plurality of magnetic pole portions and positioned radially inward of the claws;
a pair of the claws is positioned radially outward of each of the magnet insertion spaces;
a first space is provided between the pair of the claws positioned radially outward of each of the magnet insertion spaces, each of the outer connection portions is positioned radially outward of the first space, and second spaces are provided between the claws and the outer connection portions; and
the claws include slant surfaces which gradually become closer to base end portions of the claws along entire lengths of the claws as the slant surfaces extend radially outward, the second spaces being provided between the slant surfaces and radial inner surfaces of the outer connection portions.

2. The rotor core of claim 1, wherein a radial outer surface of each of the outer connection portions is positioned radially inward of the radial end surface of each of the plurality of magnetic pole portions.

3. The rotor core of claim 1, wherein the outer connection portions are curved radially outward.

4. The rotor core of claim 1, further comprising:
an inner connection portion positioned radially inward of the magnetic pole portions and extending in the circumferential direction; wherein
a third space exists between each of the magnet insertion spaces and the inner connection portion.

5. The rotor core of claim 4, further comprising a plurality of protrusions protruding radially outward from the inner connection portion, each of the plurality of protrusions being arranged in or substantially in the same circumferential position as a circumferential center of each of the magnet insertion spaces.

6. The rotor core of claim 1, wherein all of the plurality of magnetic core plates include the claws.

7. The rotor core of claim 1, wherein all of the plurality of magnetic core plates include the outer connection portions.

8. A motor comprising:
a stationary unit; and
a rotary unit rotatably supported with respect to the stationary unit; wherein
the stationary unit includes a plurality of teeth radially extending with respect to a center axis and a coil defined by a conductive wire wound around the plurality of teeth;
the rotary unit includes a shaft extending along the center axis, the rotor core of claim 1 fixed to the shaft and a plurality of magnets accommodated within the magnet insertion spaces of the rotor core; and
the rotor core is positioned radially inward of the teeth, each of the plurality of magnets including a radial outer surface at least partially contacting a radial inner surface of each of the claws.

9. The motor of claim 8, wherein the rotor core includes axially-extending grooves provided in borders between the circumferential end surfaces of the plurality of magnetic pole portions and the radial inner surfaces of the claws, and the radial gap and the circumferential gap between the grooves and the corners of the magnets are larger than the radial gap between the radial inner surfaces of the claws and the magnets and the circumferential gap between the circumferential end surfaces of the plurality of magnetic pole portions and the plurality of magnets.

10. The motor of claim 8, wherein the plurality of magnets are ferrite-based sintered magnets.

11. A manufacturing method of the motor of claim 8, comprising the steps of:
a) preparing the rotor core; and
b) accommodating the plurality of magnets within the magnet insertion spaces.

* * * * *